United States Patent Office 2,759,813
Patented Aug. 21, 1956

2,759,813
BEATER SATURATION OF ASBESTOS FIBERS

David A. Feigley, Jr., Lancaster Township, Lancaster County, Pa., assignor to Armstrong Cork Company, Lancaster, Pa., a corporation of Pennsylvania No Drawing. Application July 22, 1953,
Serial No. 369,724

6 Claims. (Cl. 92—21)

This invention relates to the preparation of saturated asbestos fiber sheet materials. More particularly, the invention relates to a process of preparing such products in which the rubber content of a rubber latex is deposited upon the fibers while in suspension, such as in a conventional papermaking beater, and thereafter forming the resulting slurry of coated fibers into a sheet.

Rubber-bonded asbestos fiber sheet material has been prepared by a number of methods, including one known as the beater saturation process, which includes depositing the solids content of a rubber latex upon the fibers while in a slurry, and thereafter forming a sheet from the coated fibers by means of conventional papermaking techniques. This process offers numerous advantages, as improved physical properties such as high tensile strength and the like may be obtained. However, there have been numerous difficulties involved in the production of an asbestos sheet by the beater saturation process, inasmuch as the asbestos fibers differ significantly from other papermaking fibers, such as wool or cellulose. Generally speaking, beater saturation methods which gave uniformly good results with cellulose fibers failed to work well upon asbestos fibers. It was not possible to obtain uniform distribution of binder solids upon the asbestos fibers because of poor precipitation of the binder.

I have found that the poor results obtained when attempts are made to coagulate rubber or other binder material upon asbestos fibers suspended in water are due to the presence in the water of substantial amounts of metallic ions derived from the asbestos. Asbestos fibers contribute polyvalent metal ions to the aqueous slurry and these ions cause an immediate partial precipitation when the rubber latex is added and before good mixing can be obtained. As a result of this partial precipitation, the finished sheet is characterized by poor distribution of the rubber binder. The effect upon the stability of the rubber latex should become apparent upon an analysis of a typical Canadian asbestos fiber material. The composition of a typical Canadian asbestos analyzes as follows:

| | Percent |
|---|---|
| $SiO_2$ | 38.7 |
| $Fe_2O_3$ | 3.07 |
| $MgO$ | 41.93 |
| $Al_2O_3$ | 0.66 |
| $FeO$ | 2.05 |
| $H_2O$ | 13.53 |

The above ingredients are present in the form of complexes. A typical asbestos slurry which may be processed in accordance with beater saturation techniques contains about 90 pounds dry asbestos dispersed in each 900 gallons of water. Under such conditions, more than enough magnesium ions will be supplied to affect the stability of the synthetic rubber latices normally used to produce rubber-bonded asbestos fiber sheets. In addition to the Mg ions, there will be a few Al and Fe ions supplied by the other constituents of the asbestos.

I have further found that rubber-bonded asbestos sheet material characterized by uniform distribution of the rubber over the fibers may be produced by a beater saturation process in which certain sequestering or chelating agents are added to the slurry prior to the addition of the synthetic rubber latex which is to be coagulated to form the binder of the asbestos sheet material. These sequestering agents apparently form a non-ionizing complex with the metallic ions present in the water and thereby prevent partial precipitation of binder solids before the desired mixing can be obtained.

I have obtained particularly advantageous results in the practice of my invention by the addition to the slurry of asbestos fibers, prior to latex addition, of selected water-soluble polycarboxylic acids and/or water-soluble salts thereof. These polycarboxylic acids are tricarboxylic acids such as citric acid and tetracarboxylic acids such as ethylene diamine tetra-acetic acid.

As indicated above, water-soluble salts of such acids may be employed in the practice of my invention. Examples of such water-soluble salts are the alkali metal salts such as sodium, potassium, and lithium of the acid set forth above. Generally speaking, I have obtained particularly advantageous results when the sodium salts of the selected polycarboxylic acids are employed. The sodium salts maintain the pH of the water slurry neutral or slightly alkaline and thus enhance its compatability with anionic latices normally employed in the beater saturation process.

The rubberlike binder employed in the practice of my invention may be any of a number of synthetic rubbers used in the practice of conventional beater saturation methods. Typical of these synthetic rubbers are the products known as GR–S, which is a copolymer of butadiene and styrene containing about 50% to about 70% butadiene; Hycar, which is a copolymer of butadiene and acrylonitrile containing about 60% to about 80% butadiene; and neoprene, which is a polymer of 2-chloro-butadiene-1,3, generally referred to as chloroprene. If desired, homopolymers of butadiene may be employed, as well as homopolymers and/or copolymers of butadiene homologues, such as isoprene. These materials can be generically designated as synthetic rubbers and more specifically designated as rubberlike polymers of butadiene, isoprene, and chloroprene, and rubberlike copolymers of butadiene or isoprene with copolymerizable vinyl compounds such as styrene and acrylonitrile. As is well known in beater saturation methods, these synthetic rubbers are added to the slurry in the form of a latex. These latices normally contain about 25% to about 40% solids. Such latices contain additional compounding ingredients such as stabilizers and the like which are well known to the art and which form no part of this invention.

After the slurry has been treated with the selected polycarboxylic acid or water-soluble salt thereof, a synthetic rubber latex is then added and the mass is slowly agitated. As the slurry is agitated, the rubber content of the latex coagulates and evenly deposits upon the asbestos fibers. The resulting slurry of coated fibers is then formed into a sheet on conventional papermaking equipment, such as a Fourdrinier wire or a cylinder machine.

In order to obtain most advantageous results, I have found that the quantity of selected polycarboxylic acid or water-soluble salt thereof should be between about .8 pound and about 1.2 pounds per 900 gallons of water. In other words, the selected polycarboxylic acid or salt thereof is used in amounts equivalent to 107 to 160 parts per million of water by weight. Unless the minimum amount of agent is employed, the coagulation of the latex may result in a knotty, lumpy precipitate, whereas when more than the maximum amount is utilized, the slurry is quite slow draining.

In order to more fully understand my invention, reference may be had to the following specific examples:

EXAMPLE I 90 pounds of asbestos fibers were added to 900 gallons of water. 1 pound of sodium citrate was added as a granular solid and the slurry agitated to insure complete solution of the citrate and its subsequent reaction with Mg and other polyvalent ions derived from the asbestos fibers. 51 pounds of "Hycar" 1561 latex (butadiene-acrylonitrile copolymer—40% solids) were then added with agitation. The solids content of the latex slowly and evenly deposited upon the asbestos fibers. The resulting slurry of coated fibers was then formed into a sheet on a Fourdrinier wire.

EXAMPLE II 90 pounds of asbestos fibers were suspended in 900 gallons of water. 1.2 pounds of citric acid were added as a granular solid and the slurry agitated to insure complete solution of the citric acid and its subsequent reaction with Mg and other polyvalent ions derived from the asbestos fibers. 51 pounds of "Hycar" 1561 latex (butadiene-acrylonitrile copolymer 40% solids) were then added with agitation. The solids content of the latex slowly and evenly deposited upon the asbestos fibers. The resulting slurry of coated fibers was then formed into a sheet on a Fourdrinier wire.

EXAMPLE III 90 pounds of asbestos fibers were suspended in 900 gallons of water. .8 pound of the sodium salt of ethylene diamine tetra-acetic acid was added as a granular solid and the slurry agitated to insure complete solution of the tetra-acetic acid salt and its subsequent reaction with Mg and other polyvalent ions derived from the asbestos fibers. 51 pounds of "Hycar" 1561 latex (butadiene-acrylonitrile copolymer—40% solids) were then added with agitation. The solids content of the latex slowly and evenly deposited upon the asbestos fibers. The resulting slurry of coated fibers was then formed into a sheet on a Fourdrinier wire.

In the above examples the sequestering agent is added to the slurry as a granular solid. However, it is within the scope of my invention to dissolve the sequestering agents in water and add the resulting solution to the slurry of asbestos fibers at the appropriate time.

The rubber-bonded asbestos sheets of my invention may be used in a wide variety of applications. However, they are particularly suited for the formation of high quality gasket material. Beater-saturated asbestos sheets made in accordance with my invention are characterized by improved tensile strengths as indicated by the following table:

Table A

|  | Tensile Strength Before Heat, #/sq. in. | Tensile Strength After 1 Hour at 300° F., #/sq. in. |
|---|---|---|
| Calendered Control | 2,750 | 3,550 |
| Calendered Sheet of Ex. I | 3,045 | 4,465 |

While I have described my invention with particular reference to the deposition of binder from synthetic rubber latices, it should be understood that the process is applicable wherever a binder suspension is affected by the presence of metal ions derived from asbestos. Thus, the binder suspension may be a latex containing butadiene-styrene resins and/or polyvinyl chloride resins, asphalt emulsions, and/or mixtures of such suspensions with each other or with the rubber latices described above.

By means of my invention, I may deposit up to 100% by weight of binder on the weight of the asbestos fibers.

I claim:

1. A method of making a beater-saturated asbestos sheet comprising forming a slurry of asbestos fibers in water; adding a compound of the group consisting of water-soluble tricarboxylic acids, water-soluble tetracarboxylic acids, and water-soluble salts thereof to form a nonionizing complex with dissolved metallic ions derived from the asbestos fibers; adding a synthetic rubber latex to the resulting slurry while agitating said slurry whereby the solids content of the binder suspension is evenly deposited upon said fibers; and forming the resulting slurry of coated fibers into a sheet.

2. A method of making a rubber-bonded asbestos sheet comprising forming a slurry of asbestos fibers in water; adding a compound of the group consisting of water-soluble tricarboxylic acids, water-soluble tetracarboxylic acids, and water-soluble salts thereof to said slurry to form a nonionizing complex with dissolved metallic ions derived from said asbestos fibers; adding a latex of a synthetic rubber of the group consisting of rubberlike polymers of butadiene, rubberlike polymers of isoprene, rubberlike polymers of chloroprene, rubberlike copolymers of butadiene with copolymerizable vinyl compounds, and rubberlike copolymers of isoprene with copolymerizable vinyl compounds while agitating said slurry whereby the solids content of said latex is evenly deposited upon said fibers; and forming the resulting slurry of coated fibers into a sheet.

3. A method of making a rubber-bonded asbestos sheet comprising forming a slurry of asbestos fibers in water; adding 107 to 160 parts per million by weight of said water of a compound of the group consisting of water-soluble tricarboxylic acids, water-soluble tetracarboxylic acids, and water-soluble salts thereof to form a nonionizing complex with dissolved metallic ions derived from said asbestos fibers; adding a synthetic rubber latex to said slurry while agitating whereby the rubber content of said latex is evenly deposited upon said fibers; and forming the resulting slurry of coated fibers into a sheet.

4. A method of making a rubber-bonded asbestos sheet comprising forming a slurry of asbestos fibers in water; adding 107 to 160 parts per million by weight of said water of sodium citrate to said slurry to form a nonionizing complex with dissolved metallic ions derived from said asbestos fibers; adding a synthetic rubber latex to the resulting slurry while agitating whereby the solids content of said latex is deposited upon said fibers; and forming the resulting slurry of coated fibers into a sheet.

5. A method of making a rubber-bonded asbestos sheet comprising forming a slurry of asbestos fibers in water; adding 107 to 160 parts per million by weight of said water of citric acid to said slurry to form a nonionizing complex with dissolved metallic ions derived from said asbestos fibers; adding a synthetic rubber latex to the resulting slurry while agitating whereby the solids content of said latex is deposited upon said fibers; and forming the resulting slurry of coated fibers into a sheet.

6. A method of making a rubber-bonded asbestos sheet comprising forming a slurry of asbestos fibers in water; adding 107 to 160 parts per million by weight of said water of sodium salt of ethylene diamine tetraacetic acid to said slurry to form a nonionizing complex with dissolved metallic ions derived from said asbestos fibers; adding a synthetic rubber latex to the resulting slurry while agitating whereby the solids content of said latex is deposited upon said fibers; and forming the resulting slurry of coated fibers into a sheet.

References Cited in the file of this patent

UNITED STATES PATENTS

| 1,502,686 | Schidrowitz | July 29, 1924 |
| 1,907,616 | Tucker | May 6, 1933 |
| 1,956,053 | Tucker | Apr. 24, 1934 |
| 2,133,693 | Greider et al. | Oct. 18, 1938 |

(Other references on following page)

UNITED STATES PATENTS

| | | |
|---|---|---|
| 2,492,702 | Neubert et al. | Dec. 27, 1949 |
| 2,626,213 | Novak | Jan. 20, 1953 |
| 2,628,918 | Wilson et al. | Feb. 17, 1953 |

FOREIGN PATENTS

| | | |
|---|---|---|
| 807,198 | France | Jan. 6, 1937 |

OTHER REFERENCES

Martell, Chemistry of the Metal Chelate Compounds, pub. by Prentice Hall, N. Y. 1952, pages 516, 540, 541, 545 and 546. (Copy in Div. 67.)